United States Patent
Miller, II et al.

(10) Patent No.: US 8,385,904 B2
(45) Date of Patent: Feb. 26, 2013

(54) SPACE TIME CODING WHERE SPACE DIVERSITY DERIVES FROM USE OF MULTIPLE BASE STATIONS

(75) Inventors: Robert R Miller, II, Convent Station, NJ (US); Leonid Razoumov, Riverdale, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 826 days.

(21) Appl. No.: 12/313,171

(22) Filed: Nov. 18, 2008

(65) Prior Publication Data

US 2010/0124917 A1    May 20, 2010

(51) Int. Cl.
*H04W 4/00* (2009.01)
(52) U.S. Cl. ..................................... 455/422.1
(58) Field of Classification Search ............... 455/422.1
See application file for complete search history.

(56) References Cited

U.S. PATENT DOCUMENTS

| | | | |
|---|---|---|---|
| 6,185,258 B1 | 2/2001 | Alamouti et al. | |
| 6,430,231 B1 | 8/2002 | Calderbank et al. | |
| 6,501,803 B1 | 12/2002 | Alamouti et al. | |
| 6,636,746 B1* | 10/2003 | Hashem et al. | 455/522 |
| 7,889,633 B2* | 2/2011 | Noh et al. | 370/208 |
| 2005/0118959 A1* | 6/2005 | Johan et al. | 455/67.11 |
| 2006/0120477 A1* | 6/2006 | Shen et al. | 375/267 |
| 2007/0281633 A1* | 12/2007 | Papadopoulos | 455/101 |
| 2008/0130769 A1* | 6/2008 | Papadopoulos et al. | 375/260 |
| 2009/0075686 A1* | 3/2009 | Gomadam et al. | 455/500 |
| 2011/0096751 A1* | 4/2011 | Ma et al. | 370/331 |

* cited by examiner

*Primary Examiner* — Nathan Mitchell
(74) *Attorney, Agent, or Firm* — Zagorin O'Brien Graham LLP

(57) ABSTRACT

A cellular arrangement where, when a cell phone is in a region where it may be served by two bases stations, it switches its mode of operation to space-time coding where the space diversity for such coding is obtained by using the antennas of the two base stations.

16 Claims, 3 Drawing Sheets

SPACE TIME CODING WHERE SPACE DIVERSITY DERIVES FROM USE OF MULTIPLE BASE STATIONS

BACKGROUND

This relates to cellular systems and, more particularly to space diversity in cellular systems.

Cellular networks provide service over a geographical area through cells that are each created by spatially separated non-mobile base stations. Each base station provides a communication channel to each wireless appliance (e.g., cell phone) in its area of coverage. The base stations interact with a network controller, which allows a cell phone in a cell that is served by one base station to communicate with cell phones served by other base stations, or to communicate with a landline phone served by a landline network. The network controller also assists in handoffs of a cell phone as it leaves the geographical area of one cell and enters the geographical area of another cell. In order to have good coverage, the base stations are often situated so that the areas covered by adjacent base stations (i.e., adjacent cells) overlap. Because of this overlap, in order to avoid interference problems initial designs of cellular networks assigned disjoint groups of channels to adjacent base stations.

In some of the newer systems the network controllers dynamically adjust the communication channels that the base stations may use. This allows a base station to use a channel that previously was used by an adjacent base station (for the benefit of some wireless appliance), but currently is not so used. The dynamic allocation of channels has three benefits. First, it generally increases the number channels that can concurrently carry conversations, second, it often allows a cell phone that has an active call to continue using the same channel even as it traverses from one cell to another, and third, it allows adjacent base stations to concurrently use a given channel as long as undue interference is not experienced, and only alter the channel assignments when interference is detected.

As depicted in FIG. 1 when cell phone 101 is in cell 10, which is the coverage area of base station 100, and employs a channel c1 that is assigned by base station 100, and cell phone 201 is in cell 20, which is the coverage area of base station 200, and employs a channel c2 that is assigned by base station 200, no interference can occur as long as channel c1 and c2 are distinct and the communication in channel c1 does not somehow spread to channel c2 (and vice versa). In fact, interference-free communication can take place even when cell phones 101 and 201 are on the same channel, as long as both cell phones are outside region 12. That is, as long as cell phone 101 cannot hear base station 200, and base station 200 cannot hear cellphone 101. It is noted that region 12 is the overlap area for communications between a wireless appliance, and two non-mobile base stations.

The overlap area between two wireless appliances where one is in cell 10 and the other is in cell 20 is larger than region 12 but, still, the interference region is significantly smaller than the area of cell 10 (or cell 20), so with the assumption that the location of a cell phone is random, one can note that the communication channels resource can be used more effectively by allowing adjacent channels to use the same set of channels, as long as a mechanism is provided for changing channel assignments so as to eliminate interference once it is recognized that interference is occurring, or information is available from which it may be deduced that interference is occurring. Illustratively, when cell phones 101 and 201 are assigned channel c1 and cell phone 101 travels toward region 200, enters region 12 and experiences interference, either cell phone 101 or cell phone 201 needs to be assigned a different available channel in order to remove the interference. The fact that cell phone 101 experiences base station interference is determined, for example, by cell phone 101 detecting pilot signals from both base stations 100 and 200, and sending the strength of the detected pilot signals through its communication with base station 100 to network controller 30. Based the received pilot signal strengths controller 30 can determine when interference is about to exceed permissible levels, prompting a reassignment procedure; and based on its knowledge of the availability of channels at base stations 100 and 200 network controller 30 can determine whether cell phone 101 or cell phone 201 should have its channel assignment altered (or whether, for some reason, both channel assignments should be altered), and informs the appropriate base station (or stations) accordingly. Controller 30 also determines whether a handoff should take place, assigning cell phone 101 to base station 200.

SUMMARY OF THE INVENTION

An advance in the art is achieved by realizing that when conditions exist such that a given cell phone in a region that is covered by two base stations can be served without interference, then it is possible to have that given cell phone be served by both base stations using space-time diversity coding. That is, when conditions are right, a cell phone that operates in a mode that is native to the network (native mode) is switched to a multi base station space-time coding (MBSST mode) and, correspondingly, the cellular network switches from serving the cell phone by one base station to serving the cell phone by the two bases stations that can communicate with the cell phone. The enhanced space-time coding that results from using the transmitting antennas of the two base stations, which are spaced orders of magnitude farther apart than transmitting antennas in prior art space time coding arrangements, is achieved by also time-synchronizing the transmissions of the two base stations, at least to within a symbol guard interval (e.g., cyclic prefix). The specific space-time code that is used is not material as long as it conforms to the total number of receiving antennas and transmitting antennas that participate in the communication. Most advantageously, one of the base stations serves as the master, where all of the processing is performed, and the other base station is used merely for its spatially removed antennas.

DETAILED DESCRIPTION

Figure 1:
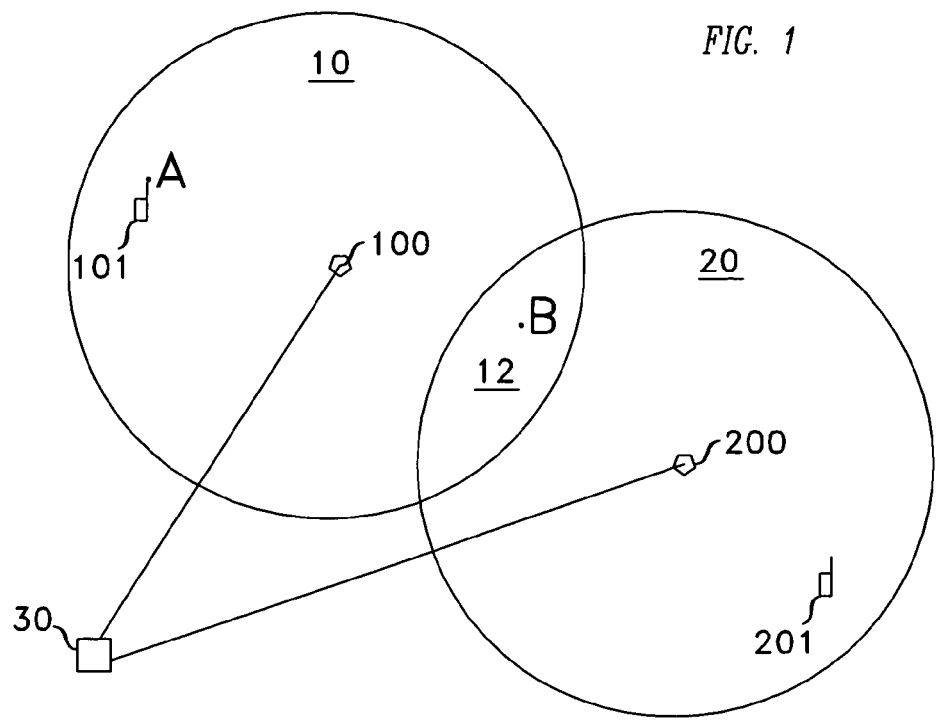
FIG. 1 shows two cells, that have a common-coverage region, and two cell phones that are served over the different channels or the same channel.
Figure 2:
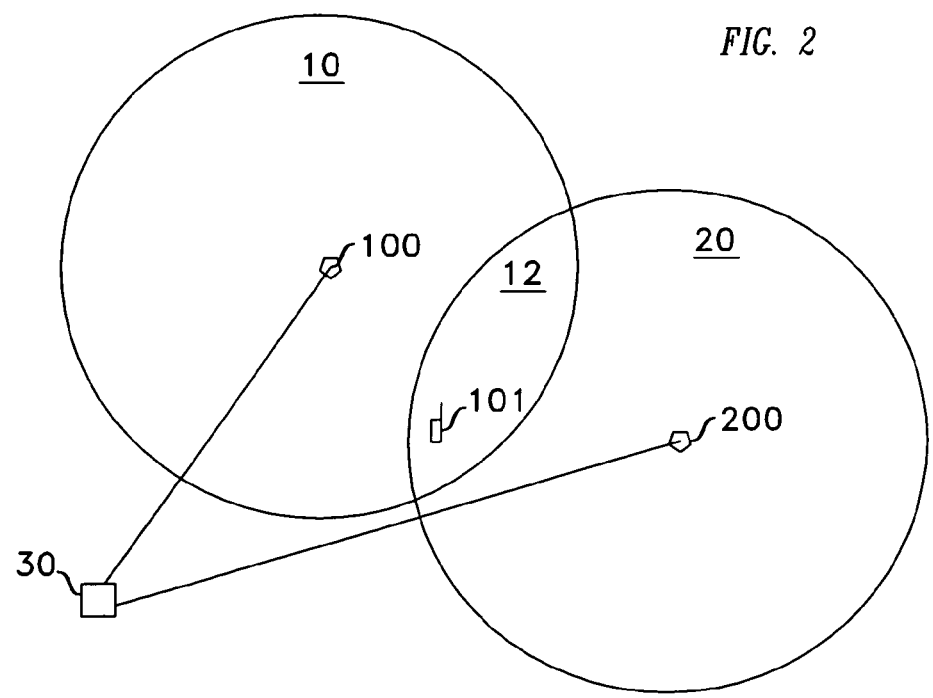
FIG. 2 shows the same cells that serve a cell phone that is situated in the common-coverage region, employing the base stations of both cells to obtain space diversity operation.

It is noted that in prior art cellular arrangements where a network controller can allocate channels to the base stations of the network, it is almost always possible to employ a channel re-allocation process to ensure that cell phones that are situated in regions that are covered by more than one base station suffer no undue interference. Illustratively with reference to FIG. 2, if cellphone 101 is in location A within the coverage area of base station 100 (cell 10) and moves to location B within region 12 while being served by base station 100 using channel c1, the situation is that either channel c1 is not used by base station 200, or channel c1 is used by base station 200 to serve another cell phone. In the latter case, controller 30 must initiate a channel re-assignment process, pursuant to which it may direct base station 200 to reassign channels so as to free-up channel c1 and to refrain from assigning channel c1 to some other cell phone.

We realized that having base station 200 refrain from using the channel that is assigned by base station 100 to cell phone 101 when cell phone 101 is in region 12 is, in a sense, a waste of resources. A more complete utilization of the transmission resource is achieved in accord with the principles disclosed herein by having base station 200 communicate with cell phone 101, concurrently with base station 100 communicating with cell phone 101. What is achieved thereby is space diversity, and an associated increase in the available throughput.

The prior art has demonstrated that multi-dimensional diversity coding is an effective approach for good wireless communication. The dimensions that may be considered are space, time, frequency, and code (such as CDMA), but most often the art considers only two dimensions from the above enumerated collection, and the two dimensions that are most often considered are space and time. Space-time coding fits well with the principles disclosed herein because space diversity is the kernel of the benefit derived from using two base stations to concurrently communicate with a cell phone.

All forms of space-time coding that are taught in the art are available to be used in accord with the principles disclosed herein, including for example the ones disclosed in U.S. Pat. Nos. 6,185,258, 6,430,231, 6,501,803. Illustratively, the coding scheme employed herein is the one disclosed in U.S. Pat. No. 6,185,258, where the transmitting arrangement contains two antennas. In this scheme, a data stream is divided into 2n-bit frames, with the first n bits of a frame defining symbol $s_0$ (typically, n is an even number greater than 0 and the symbols are complex) and the remaining n bits of a frame defining symbol $s_1$. Setting a time slot to the time required to receive n bits (consequently a frame contains 2 time slots), during a first time slot the two antennas transmit the symbols $s_0$ and $s_1$, respectively, and during the second time slot the two antennas transmit the symbols $-s_1^*$ and $s_0^*$, respectively, where the * represents the complex conjugate. Subsequent frames operate as described for the first frame.

The above is not intended to suggest that the native mode of operation is not space-time coding. If fact, the native mode of operation can be space-time coding or non-space time coding. When the native mode of operation is space-time coding (in which case the base stations each have more than one transmitting antenna), the switch from the native operation to the operation where both base stations are used may be an operation where a different space-time coding scheme is employed (e.g. one that uses more transmitting antennas), or an operation with the same space-time coding scheme is used and at least one antenna in each of the base stations is used in the scheme to provide enhanced space diversity.

Figure 3:
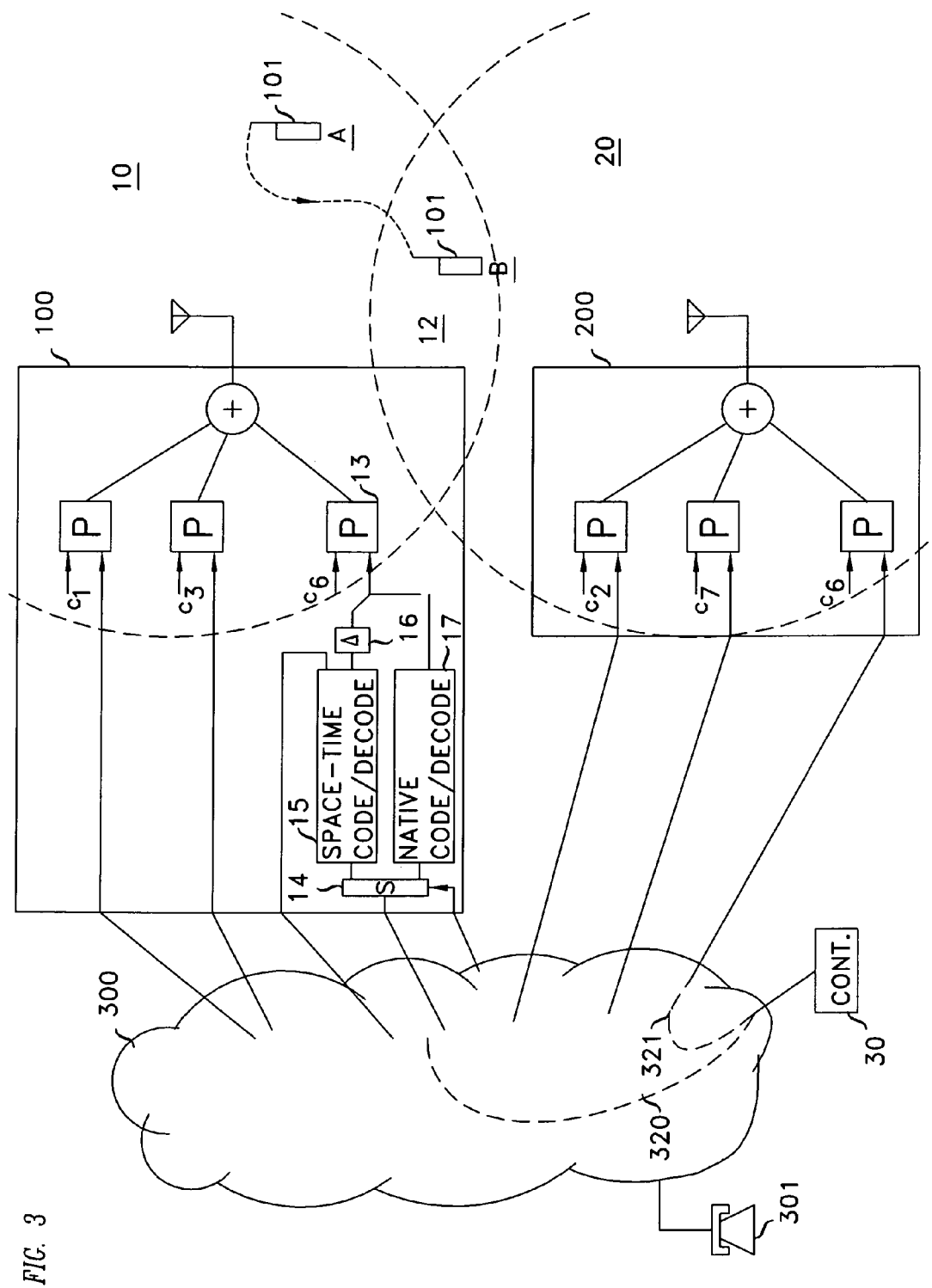
FIG. 3 shows relevant details of a base stations that operates in accord with the principles disclosed herein.

FIG. 3 depicts an arrangement where "cloud" 300 is the collection of one or more networks that interconnect base stations with other base stations, with controller 30 of the cellular network to which base stations 100 and 200 belong, and with landline phones, such as phone 301 (via a landline network). The collection of networks that combine to form network 300 is conventional. It includes communication paths and signaling paths which, for sake of clarity, are not shown in FIG. 3.

The FIG. 3 arrangement also depicts two cells (10 and 20) that are served by base stations 100 and 200, respectively. Each base station includes a plurality of processing modules, P, such as module 13, which are interposed between network 300 and the base station's antenna arrangement. It should be appreciated that though each base station is shown with a single antenna, as mentioned above, a base station may have a plurality of antennas (which plurality provides a space diversity capability to the base station as taught, for example, in the aforementioned patents). Likewise, each cell phone can have more than one antenna.

Each processing module may be configured to receive both communication information and signaling information from a wireless appliance (e.g., cell phone) within its area of coverage (i.e., with its cell), over a designated communication channel and a signaling channel, respectively. Correspondingly, each base station can send communication information and signaling information to that wireless appliance, also over a communication channel and a signaling channel. The different communication channels that are assigned to the different modules (each communicating—if at all—with one appliance) are shown in FIG. 3 by labels c1, c3, c6, c2 and c7.

In operation, illustratively, both base stations 100 and 200 broadcast a pilot signal that extends to the perimeter of each respective cell. The pilot signal informs appliances that receive the pilot signal about channels that are available for signaling the base station. One of the information items that an appliance sends to the base station is the signal strength of the received pilot signal.

If, for example, cell phone 101 turns "on" when it is in location A within cell 10, it receives the pilot signal of base station 100, and communicates a request for service through the uplink channel (to the base station). Illustratively, base station 100 was previously informed by controller 30 as to the channels (e.g., frequency bands) that base station 100 may employ, and armed with this information base station 100 chooses a channel, through a downlink (from the base station) channel it informs cell phone 101 of the chosen and assigned channel, and communication is thus enabled. Illustratively in FIG. 3, channel c6 is assigned to cell phone 101.

In accord with the principles disclosed herein, with some regularity the cellular network is informed of the location of cell phone 101. The primary inference that is sought to be derived from this information is whether two or more base stations can communicate with cell phone 101 with sufficient strength to be useful. Illustratively, with some regularity cell phone 101 informs its base station of the strength of the pilot signal that it receives from base stations 100, and also of the strength of pilot signal that it receives from other base stations as well as the identity of those base stations.

While cell phone 101 is within cell 10 but outside overlap region 12, it does not receive the pilot signal of base station 200. Consequently, its regular reporting back to base stations 100 does not include any indication of pilot signal detections from base station 200 and the conclusion is reached that there is no interference from base station 200 (and no unreasonable interference from appliances communicating with base stations 200). In such a case, the two-way communication by cell phone 101 and base stations 100 proceeds in a completely conventional manner; i.e., in the native mode of the FIG. 3 arrangement.

While cell phone 101 is active in a conversation it may move and find itself in location B within overlap region 12. At that time, cell phone 101 does receive the pilot signal broadcast by base station 200, and so informs base station 100 in the course of its regular reporting back. Base station 100 illustratively sends this information to controller 30. Controller 30 receives the information about the fact that cell phone 101 receives the pilot signals of base stations 100 and 200, and the strengths of those signals, and from that information determines whether cell phone 101 should remain in communication, and be associated, with base station 100 or be handed off to base station 200. In either case, by communicating with base station 100, or base stations 200, or both, controller 30 makes sure that cell phone 101 is associated with one of the base stations, using a particular channel (which may be the one used before, but not necessarily so) and that the base station with which cell phone 101 is not associated does not use the channel that particular channel for serving some other appliance. Illustratively, controller 30 concludes that cell phone 101 should remain associated with base station 100, should continue using channel c6, and informs base station 200 that channel c6 may not be used for serving any other appliance.

In accord with the principles disclosed herein, controller 30 goes further and directs the switching of operation from the native mode to the multi base station space-time coding mode, (MBSST mode), where the space-time diversity is provided by the antenna arrangements of base stations 100 and 200, and specifies the base station that is the master station (according to the above illustration, base stations 100). This directive is implemented by the master station information cell phone 101 to switch from the native mode to the MBSST mode, and by diverting at least one stream of bits for transmission by the antenna arrangement of base stations 200.

In an implementation where the native mode does not employ a space-time scheme, such as in FIG. 3, the switch to the MBSST mode is effected by redirecting (for example, by means of switch 14) the stream of bits that otherwise would be sent via native encoder/decoder unit 17 to the processing unit 13 that communicates with cell phone 101 over channel c6, to a space-time encoder/decoder unit 15 that develops two bit streams, with one of the bit steams being sent to the just-mentioned unit 13 of base station 100, and the other bit stream being sent to a processing unit within base station 200 that is directed to communicate with cell phone 101 over channel c6. Correspondingly, signals received by the antenna arrangements of base stations 100 and 200 are sent to unit 15—in its capacity as a decoder—to recover the signal sent by cell phone 101. It is noted that at least some of this work that is said to be done by controller 30 can be done by control circuitry within base station 100.

It is expected that a delay would exist in the signal flow of the bit stream that leaves element 15, flows to controller 30 via network 300, is sent to base station 200, and there it is applied to a processing unit in preparation for transmission by the antenna arrangement of base station 200. Since space-time encoding assumes that the two streams are transmitted in time synchronism, it is necessary to inject a delay in the bit stream that flows from element 15 to unit 13 of base stations 10. This is provided by delay element 16. The value of this delay is easily derived, for example, from a training signal that, at some intervals, is sent from base station 100 and then (for example one time slot later) from base station 200. The synchronization need not be very fine. Space-time coding creates frames of symbols. In the aforementioned U.S. Pat. No. 6,185,258 patent, each frame contains a pair of adjacent symbols, and there are other space-time codes where there are more symbols per frame. In some applications the frames are augmented with a cyclic prefix code, in which can the alignment can be as coarse as symbol guard interval (e.g., cyclic prefix). Cell phone 101 can determine the difference in arrival times, from which the delay is directly ascertainable and communicate that information to the base station in order for it to adjust the value of delay 16.

Figure 4:
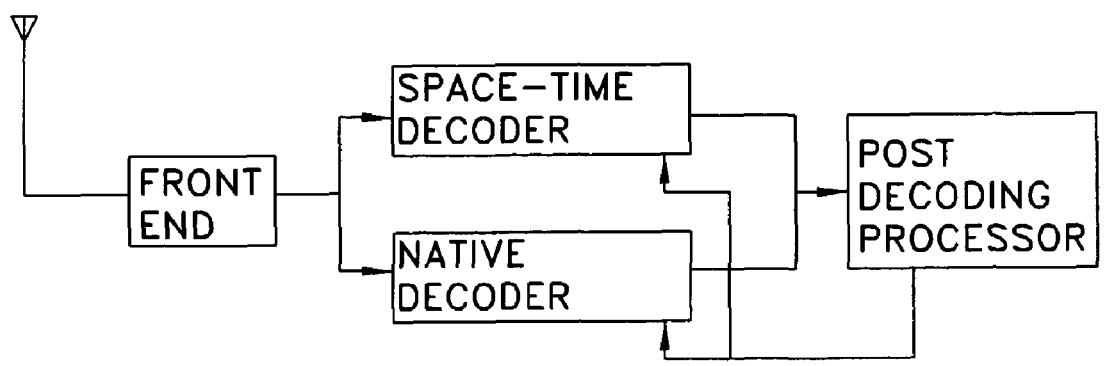
FIG. 4 show a cell phone that is constructed with the capability to operate in the environment disclosed herein.

It is noted that just as the base stations need to be constructed to be able to operate in a native mode or in the MBSST mode (relative to any particular cell phone), so do the cell phones. In one of the simplest approaches the native mode is a non-space-time coding mode, and the MBSST mode is space-time coding according, for example, the scheme disclosed in the aforementioned U.S. Pat. No. 6,185,258. In such a case, each cell phone illustratively comprises a block for native-mode decoding, and a block for space-time decoding. Choice as to which of the decoding block is actively employed is control by a post-decoding processor that receives control signals from the base station, directing to switch between the two different modes, as necessary. This is illustrated in FIG. 4. Of course, it is possible to have applications where the coding schema does not change, in the sense that space-time coding is always employed, and the two different modes of operation are (a) a base station (e.g., 100) employing two antennas that are co-located with the base station, and (b) the base station employing just one of the antennas that is co-located with the base station, and using one antenna that is co-located with another base station (e.g. 200).

The invention claimed is:

1. A method for communicating a signal to a mobile appliance in a cellular network comprising:
    encoding a signal destined to said mobile appliance using a first coding scheme that develops at least two concurrent streams of symbols;
    sending to said mobile appliance at least one of said at least two concurrent streams via a second base station;
    sending to said mobile appliance remaining ones of said at least two concurrent streams via a first base station; and
    said first base station receiving a signal from a controller that places said first base station in a first state, or in a second state, and said first base station executes said steps of encoding and sending only when said first base station is placed in said first state.

2. The method of claim 1 wherein said first base station, when it is in said second state, executes the steps of:
    encoding said signal that is destined to said mobile appliance using a second coding scheme that develops one or more concurrent streams of symbols; and
    sending all of the developed streams to said mobile appliance via its own antenna arrangement.

3. The method of claim 2 wherein said second coding scheme is the same as said first coding scheme.

4. An arrangement that includes a plurality of base stations, wherein each base station of said base stations comprises:
    an encoder, responsive to a signal that is destined to a wireless appliance, for developing N symbol streams, where $N \geq 2$;
    a circuit responsive to a received control signal that, when:
        (a) said received control signal indicates a first state, diverts one or more of said N symbol streams for transmission to another one of said base stations, and applies remaining ones of said N symbol streams to an antenna arrangement of said base station; and
        (b) said received control signal indicates a second state, diverts none of said N symbol streams for transmission to another one of said base stations, and applies all of said N symbol streams to said antenna arrangement of said base station.

5. An arrangement that includes a plurality of base stations, each of which comprises:
- an encoder that, when a control signal indicates a first state, develops a first number of symbol streams in response to a received signal that is destined to a wireless appliance and, when said control indicates a second state, develops a second number of symbol streams in response to said received signal; and
- a circuit that, when said control signal indicates said first state, diverts one or more of the developed symbol streams (remote flow) for transmission to another one of said base stations and applies remaining ones of the developed symbol streams (local flow) to an antenna arrangement of said base station, and when said control signal indicates said second state applies all of the developed symbols streams to said antenna arrangement.

6. The arrangement of claim 5 wherein said control signal affects operation of said encoder and said circuit relative to said destined wireless appliance.

7. The arrangement of claim 5 wherein said first number of streams is equal to or greater than said second number of streams.

8. The arrangement of claim 4 wherein said encoder, when it develops two or more symbol streams, employs a space-time encoding scheme to develop said two or more symbol streams.

9. The arrangement of claim 8 wherein said two or more symbol streams create symbols in time slots that are substantial alignment with each other across said symbol streams, and the symbols in a set of k adjacent time slots form a space-time coding set.

10. The arrangement of claim 9 wherein said local flow that is applied to said antenna arrangement of said base station is delayed relative to said remote flow.

11. The arrangement of claim 10 wherein said delay is imposed to align transmission of the symbol streams of said remote flow that are transmitted to said wireless appliance by said another base station with transmission of the symbol steams of said local flow by said antenna arrangement of said base station to said wireless appliance.

12. The arrangement of claim 11 wherein each space-time coding set contained in both said local flow and said remote flow is augmented with one or more cyclic prefix symbols.

13. The arrangement of claim 12 wherein said delay is accurate to within the interval of said cyclic prefix.

14. The arrangement of claim 11 wherein said first base station has a first area of coverage and said another base station has a second area of coverage that, in part, overlaps said first area of coverage, thus forming an overlap region.

15. An arrangement that includes a plurality of base stations, each of which comprises:
- an encoder, responsive to a signal that is destined to wireless appliance, for developing N symbol streams, where $N \geq 2$;
- a circuit responsive to a received control signal that, when:
  - (a) said received control signal indicates a first state,
  - diverts one or more of said N symbol streams (remote flow) for transmission to another one of said base stations, and applies remaining ones of said N symbol streams (local flow) to an antenna arrangement of said base station; and
  - (b) said received control signal indicates a second state,
  - diverts none of said N symbol streams for transmission to another one of said base stations, and applies all of said N symbol streams to said antenna arrangement of said base station:
- wherein
- said encoder, when it develops two or more symbol streams, employs a space-time encoding scheme to develop said two or more symbol streams;
- wherein delay is imposed to align transmission of the symbol streams of said remote flow that are transmitted to said wireless appliance by said another base station with transmission of the symbol streams of said local flow by said antenna arrangement of said base station to said wireless appliance;
- said first base station has a first area of coverage and said another base station has a second area of coverage that, in part, overlaps said first area of coverage, thus forming an overlap region; and
- said control signal assumes said second state when said first base station receives information that said appliance is within said overlap area.

16. The arrangement of claim 15 wherein said control signal assumes said second state when said first base station receives information that said appliance is within said overlap area and information from which it is inferable that level of interference suffered by said appliance exceeds a preselected level.

* * * * *

UNITED STATES PATENT AND TRADEMARK OFFICE
CERTIFICATE OF CORRECTION

PATENT NO. : 8,385,904 B2  
APPLICATION NO. : 12/313171  
DATED : February 26, 2013  
INVENTOR(S) : Robert R. Miller, II et al.

Page 1 of 1

It is certified that error appears in the above-identified patent and that said Letters Patent is hereby corrected as shown below:

On the Title Page

In the Abstract, line 2, please replace "bases" with --base--;

In the Claims

Column 7, line 28, please insert --in-- after "are".

Signed and Sealed this  
Thirtieth Day of September, 2014

Michelle K. Lee  
*Deputy Director of the United States Patent and Trademark Office*